United States Patent [19]

Semmekrot

[11] Patent Number: 5,013,233

[45] Date of Patent: May 7, 1991

[54] DISTRIBUTIVE MIXER DEVICE

[75] Inventor: Gerardus J. M. Semmekrot, Borne, Netherlands

[73] Assignee: Universiteit Twente, Enschede, Netherlands

[21] Appl. No.: 346,051

[22] Filed: May 1, 1989

[30] Foreign Application Priority Data

May 3, 1988 [NL] Netherlands ............... 8801156

[51] Int. Cl.⁵ ............... B29C 45/52; B29C 47/64
[52] U.S. Cl. ............... 425/208; 264/349; 366/82; 425/209; 425/382.3; 425/542; 425/563
[58] Field of Search ......... 366/79, 81, 82, 89, 366/90; 264/349; 425/208, 563, 542, 200, 209, 382.3

[56] References Cited

U.S. PATENT DOCUMENTS

| 3,317,959 | 5/1967 | List ............... 425/208 |
| 3,583,684 | 6/1971 | Schippers ............... 366/81 |
| 4,152,076 | 5/1979 | Driskill ............... 366/79 |
| 4,253,771 | 3/1981 | Renk ............... 366/89 |
| 4,595,546 | 6/1986 | Wheeler ............... 425/208 |

FOREIGN PATENT DOCUMENTS

| 0048590 | 3/1982 | European Pat. Off. . |
| 1778515 | 2/1972 | Fed. Rep. of Germany . |
| 2162709 | 6/1973 | Fed. Rep. of Germany . |
| 2327540 | 12/1974 | Fed. Rep. of Germany . |
| 2635144 | 2/1978 | Fed. Rep. of Germany ...... 425/563 |
| 1523602 | 3/1968 | France . |
| 52-14659 | 2/1977 | Japan . |
| 925653 | 5/1982 | U.S.S.R. ............... 264/349 |
| 925654 | 5/1982 | U.S.S.R. ............... 425/208 |
| 930339 | 7/1963 | United Kingdom . |
| 1475216 | 6/1977 | United Kingdom . |

OTHER PUBLICATIONS

*The Cavity Transfer Mixer:* 1980 *to* 1988, Martin Gale, Paper Presented Nov. 15, 1988 at Seminar Organized by Rapra Technology Limited, ®1988.
*Twente Mixing Ring,* for Homogenising the Melt in Injection Moulding Machines and Extruders, Product Brochure.

*Primary Examiner*—Jay H. Woo
*Assistant Examiner*—James P. Mackey
*Attorney, Agent, or Firm*—Christensen, O'Connor, Johnson & Kindness

[57] ABSTRACT

The invention relates to a mixer device with distributive mixing action for an extruder, an injection moulding machine and the like, including a hollow stator and a rotor arranged for rotation in the stator and at least one separate mixing ring which is provided at least on its interior surface with mixing elements and which is arranged between the rotor and stator around the rotor for free rotation, characterized in that the mixing elements include passages which are radially orientated in the mixing ring and are facing at one end the inner stator surface and on the other the outer rotor surface, and to a rotor section, to a mixing ring, to an extruder, and to an injection moulding machine provided with same.

13 Claims, 4 Drawing Sheets

DISTRIBUTIVE MIXER DEVICE

TECHNICAL FIELD

The present invention relates to a mixer device with distributive mixing action for an extruder, an injection moulding machine and the like, comprising a hollow stator, a rotor arranged for rotation in the stator and distributively acting mixing means.

BACKGROUND OF THE INVENTION

A known mixer device is for example described in British patent specification Nos. 930.339 and 1.475.216 and the European patent application No. 48.590.

With such a known mixer device of the so-called cavity transfer type the mixing means consist of mutually coacting mixing cavities arranged in the exterior surface of the rotor and in the interior surface of the stator. These mixing cavities can be arranged peripherally in staggered rows in the rotor and stator as in the European patent application No. 48.590 whereby rows of mixing cavities are arranged axially staggered in the stator and rotor.

The known mixer device according to the above stated patent publications requires the arrangement of mixing cavities in the interior surface of the stator across an axial length which for an extruder is substantially equal to the mixing section of the rotor and in the case of an injection moulding machine substantially equal to the stroke length of the mixing section of the rotor. The arrangement of these mixing cavities in the interior surface of the stator entails relatively high production costs, while the mixing sections in the rotor and stator must be geared to one another, which decreases the extent of interchangeability.

Another similar mixer device is the pin mixer whereby the mixing means comprise pins arranged spread in axial planes over the interior surface of the stator which extend as far as breaks in the rotor screw thread(s).

The German patent application No. 2,327,540 discloses a mixer device attached to the downstream end of an extruder screw. This mixer device comprises a rotor and a mixing ring mounted for rotation on and around the rotor. The mixing ring consists of several sleeves spaced apart by dam rings and separating an outer annular mixing chamber from an inner annular mixing chamber. The outer mixing chamber facesthe inner surface of the stator, whereas the inner chamber faces the outer surface of the rotor. Via bores the inner and outer mixing chamber communicate with downstream mixing chambers. The distributive mixing action of this mixing ring is relatively low, and the main object of the mixing ring is a radial change in place relative to the rotor and stator. Warm and cold material change place during the downstream movement and accordingly the thermal homogenity of the mixed material is improved. Furthermore, the residence time of the material to be mixed does not affect or to a very minor extent affects the mixing quality.

SUMMARY OF THE INVENTION

The invention has for its object to provide a new mixer device of which, due to the rather simple construction, the manufacturing costs are relatively low, and of which the distributive mixing action is expected not to be negatively effected.

Accordingly, the invention provides a mixer device with distributive mixing action for an extruder, an injection moulding machine and the like, comprising a hollow stator and a rotor arranged for rotation in said stator and at least one separate mixing ring which is provided at least on one of its surfaces with mixing means and which is arranged between said rotor and stator around said rotor for free rotation, characterized in that said mixing means comprise passages which are radially orientated in the mixing ring and are facing at one end the inner stator surface and on the other the outer rotor surface.

Due to the relative rotation of the stator and rotor, the end faces of the mixing passages are facing moving surfaces, so that dead corners and degeneration of the material are avoided. In a mixing passage the material is subjected to an internal mixing due to the movement of the surfaces of the stator and the rotor.

The rotor surface enclosed by the mixing ring can also be smooth, resulting in production costs being considerably lower with a proper mixing action.

If the exterior surface of the rotor is provided with mixing cavities which are situated opposite to and co-act with the passages, the mixing action is further improved, because in the passages of the mixing ring and in the mixing cavities of the rotor vortexes of material to be mixed are generated, of which parts are transferred along the circumference to the next passages or cavities. When a mixing passage moves along a mixing cavity of the rotor, the stream of material is divided and turned over, accordingly, the rotation results in an increase of the mixing surface. The axial displacement corresponds with the throughput of the mixer device and the content of the passages and mixing cavities. The various steps of dividing the material stream, of increasing the separation surface, of turning over and combining separated streams of material occur in the proper order in and between the passages of the mixing ring and the mixing cavities of the rotor. The mixing quality may be selected on the number of mixing cycli desired, and accordingly, by adjusting the throughput of the mixer device, the content of the passages and mixing cavities and the rotational speed normally being adjusted between 5 to 20% of the rotor speed.

If after mixing of the viscous material this material is ejected using the axially slidable rotor, flow-back of the material has to be avoided; for this purpose the mixing ring can further be provided with extension in the form of an annular valve body which co-acts with a valve seat arranged on the rotor.

The mixing ring can be arranged simply on the rotor if in preference a rotor section enclosed by the mixing ring is detachably connected to the adjoining part of the rotor.

The invention finally relates to this rotor section and to an extruder, and injection moulding machine and the like which are provided with such a mixer device or rotor section.

BRIEF DESCRIPTION OF THE DRAWINGS

Mentioned and other features will be elucidated hereafter with reference to a number of embodiments of a mixer device according to the invention, which embodiments are given by way of example. Reference is made hereby to the annexed drawing.

In the drawings.

DETAILED DESCRIPTION OF THE PREFERRED EMBODIMENT

Figure 1:
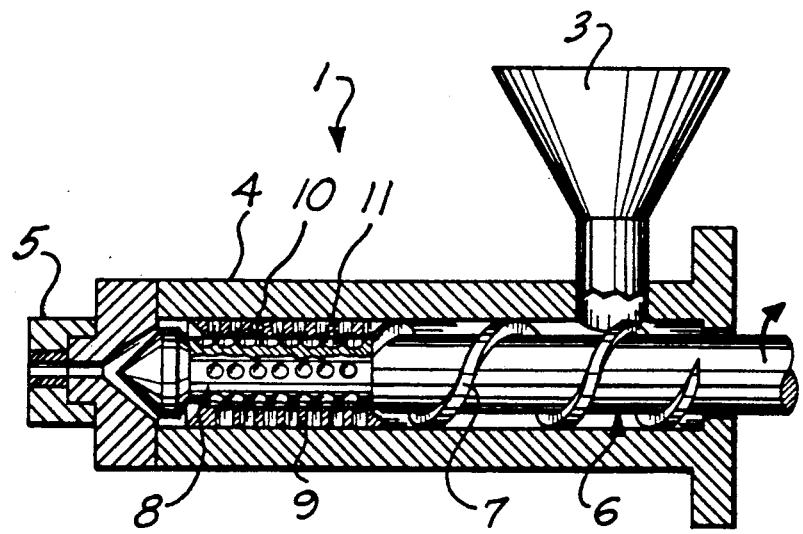
FIGS. 1 and 2 each show respectively views of a section of an extruder and an injection moulding machine according to the invention.
Figure 2:
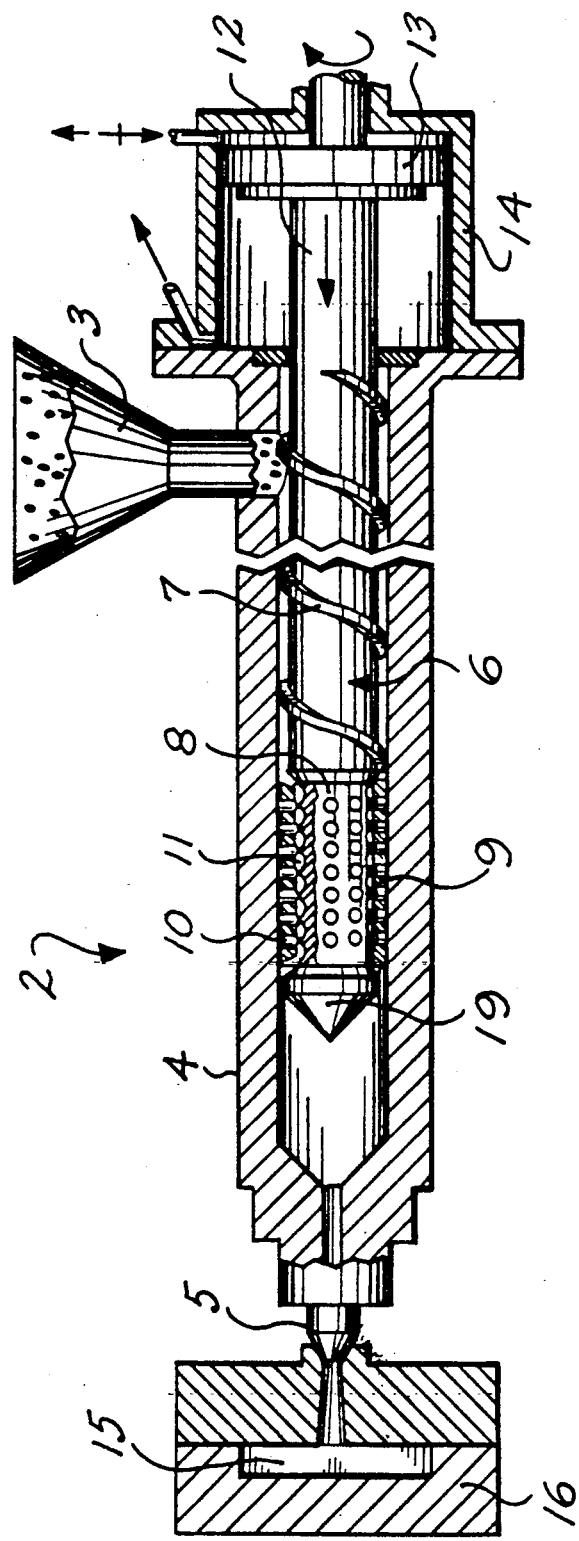

FIGS. 1 and 2 show respectively an extruder 1 and an injection moulding machine 2 according to the invention.

The extruder 1 comprises a hollow cylindrical stator 4 having an injection nozzle 5 and provided with a supply funnel 3. A rotatable rotor 6 is arranged in the stator 4. The rotor 6 comprises a threaded section 7 and a mixing section 8. The mixing section 8 comprises a mixing ring 9 arranged for free rotation around the rotor and provided on its interior surface with mixing ring cavities 10 which are situated opposite to and co-act with rotor mixing passages 11 arranged in a narrowed portion of the rotor 6.

FIG. 2 shows the injection moulding machine 2 according to the invention. The construction elements corresponding with the extruder 1 are indicated with the same reference numerals. In this case the rotor 6 is provided with a piston rod 12 with the piston 13 which is slidably and rotatably guided in the piston chamber 14. In FIG. 2 the rotor 6 can execute a rotation and translation movement. During the translation mixed, viscous material is ejected into the die cavity 15 of the die 16. In order to avoid flowback of material during the injection moulding the mixing ring 9 is provided with an annular valve body 17 which coacts with a valve seat 18 arranged on the rotor such that during injection moulding the passage between the mixing ring and the rotor is closed off by the annular valve body 17.

Figure 3:
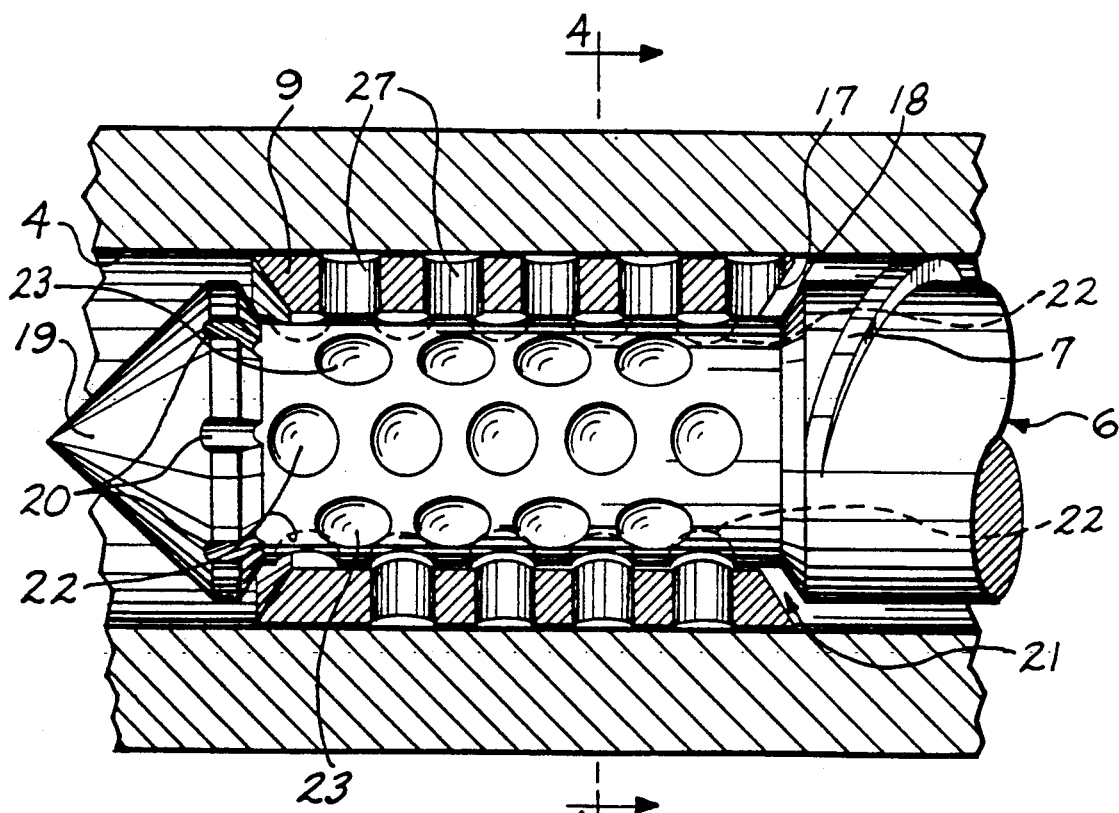
FIG. 3 is detail III from FIG. 2 on a larger scale.

For optimal transport of the material along the rotor nose 19 the latter can be provided with lengthwise grooves 20 (FIG. 3).

Figure 4:
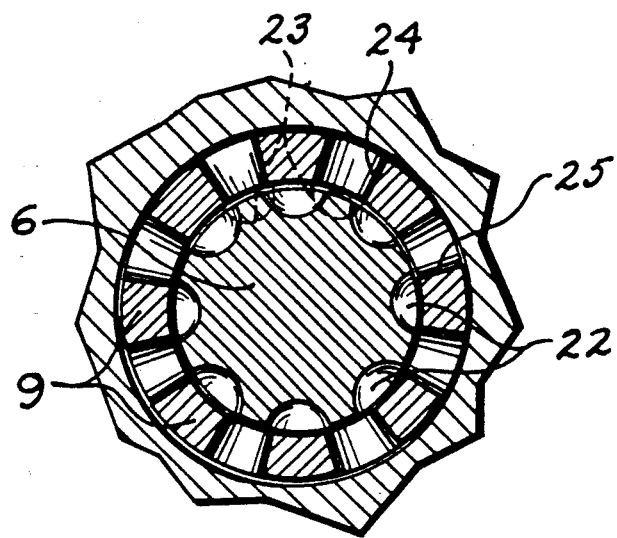
FIG. 4 shows a section along the line IV—IV from FIG. 3.

FIGS. 3 and 4 show in more detail the mixing section of the rotor 6 from FIG. 2. This mixing section can also be applied in the extruder 1 according to FIG. 1, with or without the annular valve body 17 with its valve seat 18.

In the narrowed rotor portion 21 the rotor mixing cavities 22 and 23 are arranged peripherally in staggered rows relative to each other. Rows of mixing passages 24 and 25 radially orientated in the mixing ring 9 are arranged in staggered rows in the mixing ring 9 so that the radial mixing passages 24 face at one end the inner surface of the stator 4 and at the other end the outer surface of the rotor 6 provided with the mixing cavities 22 and 23. During mixing the mixing ring 9 undergoes a force in forward direction through the flow of the material for mixing which results in it being pressed against the rotor nose 19. Owing to the presence of the material and the embodiment of the contact surfaces there is little friction hereby so that the rotational speed difference between the rotor 6 and the mixing ring 9 is hardly influenced. In this situation the mixing passages 24 and 25 and the rotor mixing cavities 22 and 23 are axially displaced relative to each other in the configuration most favourable for mixing.

The mixing ring 9 can slide easily onto the rotor part 21 when this part is detachably fastened to the threaded section 7 of rotor 6.

Figure 5:
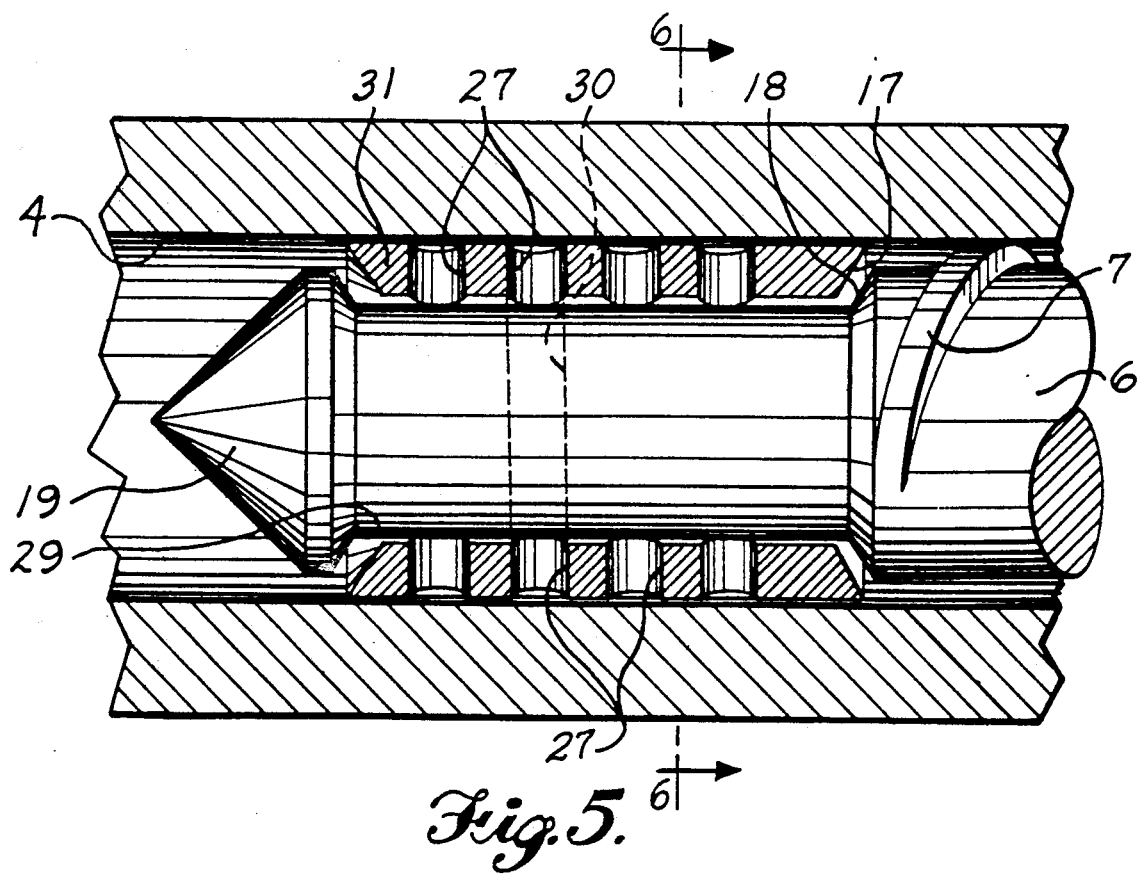
FIG. 5 shows a view corresponding to FIG. 3.
Figure 6:
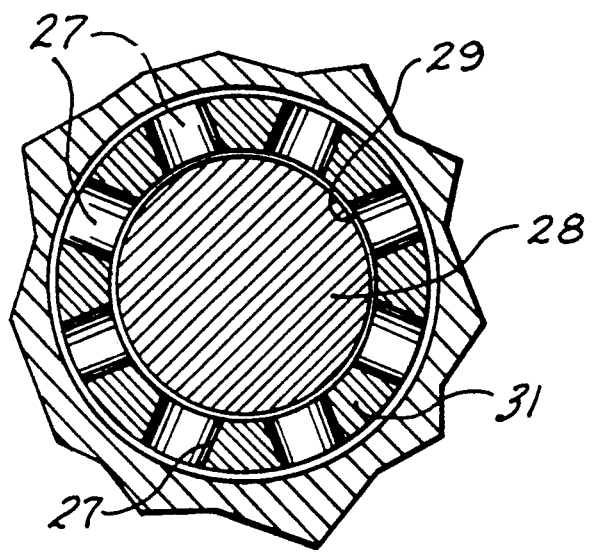
FIG. 6 shows a section along the line VI—VI from FIG. 5.

FIGS. 5 and 6 show a variant whereby the mixing ring is provided with radially directed passages 27 arranged therein in rows of passages 27 that are not mutually staggered and over the circumference of the mixing ring 31 the passages 27 of different rows are arranged in a common immaginary mixing ring portion 30. This results in an increase in the compression strength of the mixing ring 31.

In this variant the mixing ring 31 having the radially directed rows passages 27 is located around a narrowed rotor portion 28, the surface 29 of which is smooth, in other words there are no mixing members present in the surface 29 which co-act with the passages 27.

A skilled person will appreciate that the mixing rings 9 and 31 may be used on both types of rotors having a smooth rotor portion 28 or a rotor portion 21 provided with mixing cavities 22 and 23.

The mixer device according to the invention can be used for mixing viscous materials such as melted plastics and rubber, materials such as soap and clay in addition to foodstuffs such as dough and margarine.

I claim:

1. An extruder, the extruder comprising a mixer device with distributive mixing action, the mixer device having a hollow stator with an inner surface, a rotor having an outer surface and arranged for rotation in said stator, and at least one separate mixing ring arranged between said rotor and said stator for rotation around said rotor, said mixing ring having passages that are radially oriented in said mixing ring, the passages at one end substantially abutting said inner stator surface and at another end substantially abutting said outer rotor surface.

2. The extruder of claim 1, wherein said outer surface of said rotor is provided with mixing cavities that coact with said passages on said mixing ring.

3. The extruder of claim 2, wherein said passages are arranged in rows over the length of said mixing ring.

4. The extruder of claim 3, wherein said mixing ring is provided with an annular valve body that coacts with a valve seat arranged on said rotor.

5. The extruder of claim 4, wherein a rotor section enclosed by said mixing ring is detachably connected to an adjoining part of said rotor.

6. The extruder of claim 4, wherein said rotor has a nose portion with longitudinal grooves formed therein.

7. An injection moulding machine, the injection moulding machine comprising a mixer device with distributive mixing action having a hollow stator with an inner surface, a rotor having an outer surface and arranged for rotation in said stator, and at least one separate mixing ring arranged between said rotor and said stator for rotation around said rotor, said mixing ring having passages that are radially oriented in said mixing ring, the passages at one end substantially abutting said inner stator surface and at another end substantially abutting said outer rotor surface.

8. The injection moulding machine of claim 7, wherein said passages are arranged in longitudinal rows along said mixing ring.

9. The injection moulding machine of claim 7, wherein said outer surface of said rotor is provided with mixing cavities that coact with said passages on said mixing ring.

10. The injection moulding machine of claim 9, wherein said passages are arranged in rows over the length of said mixing ring.

11. The injection moulding machine of claim 10, wherein said mixing ring is provided with an annular valve body that coacts with a valve seat arranged on said rotor.

12. The injection moulding machine of claim 11, wherein a rotor section enclosed by said mixing ring is detachably connected to an adjoining part of said rotor.

13. The injection moulding machine of claim 12, wherein said rotor has a nose portion with longitudinal grooves formed therein.

* * * * *

UNITED STATES PATENT AND TRADEMARK OFFICE
CERTIFICATE OF CORRECTION

PATENT NO. : 5,013,233
DATED : May 7, 1991
INVENTOR(S) : Gerardus J. M. Semmekrot It is certified that error appears in the above-identified patent and that said Letters Patent is hereby corrected as shown below:

| COLUMN | LINE | ERROR |
|---|---|---|
| 3 | 5 | "line IV-IV" should be --line 4-4-- |
| 3 | 8 | "line VI-VI" should be --line 6-6-- |

Signed and Sealed this

First Day of December, 1992

Attest:

DOUGLAS B. COMER

Attesting Officer     Acting Commissioner of Patents and Trademarks